United States Patent
Lee et al.

(10) Patent No.: US 8,154,997 B2
(45) Date of Patent: Apr. 10, 2012

(54) COMMUNICATION SIGNAL PROCESSING APPARATUS FOR REPEATER

(75) Inventors: Jun Goo Lee, Seoul (KR); Ri Hong Lee, Seoul (KR); Sang Seob Lee, Suwon Gyeonggi-Do (KR); Sang Hoon Oh, Seoul (KR)

(73) Assignee: Ufine Technologies Co., Ltd., Seoul (KR)

( * ) Notice: Subject to any disclaimer, the term of this patent is extended or adjusted under 35 U.S.C. 154(b) by 653 days.

(21) Appl. No.: 12/337,329

(22) Filed: Dec. 17, 2008

(65) Prior Publication Data

US 2009/0207779 A1 Aug. 20, 2009

(30) Foreign Application Priority Data

Feb. 20, 2008 (KR) ........................ 10-2008-0015586

(51) Int. Cl.
*G01R 31/08* (2006.01)

(52) U.S. Cl. ...................................................... 370/229
(58) Field of Classification Search ........... 370/229–240
See application file for complete search history.

(56) References Cited

U.S. PATENT DOCUMENTS

| | | | |
|---|---|---|---|
| 7,308,003 B2* | 12/2007 | Lev et al. | 370/474 |
| 2005/0276284 A1* | 12/2005 | Krause et al. | 370/538 |
| 2008/0043704 A1* | 2/2008 | Geile | 370/342 |

* cited by examiner

*Primary Examiner* — Chi Pham
*Assistant Examiner* — Fan Ng
(74) *Attorney, Agent, or Firm* — IPLA P.A.; James E. Bame

(57) ABSTRACT

A communication signal processing apparatus for a repeater includes an interface for receiving the communication signals of at least two different communication services, and a communication signal processor for combining a pair of different communication signals into a single digital signal, converting the single digital signal into a frame and serializing the frame.

7 Claims, 8 Drawing Sheets

COMMUNICATION SIGNAL PROCESSING APPARATUS FOR REPEATER

CROSS REFERENCE

This application claims foreign priority under Paris Convention and 35 U.S.C. §119 to Korean Patent Application No. 10-2008-0015586, filed Feb. 20, 2008 with the Korean Intellectual Property Office.

BACKGROUND OF THE INVENTION

1. Field of the Invention

The present invention relates generally to a communication signal processing apparatus for a repeater, and, more particularly, to a communication signal processing apparatus for a repeater that is capable of maximizing the relay efficiency of a communication service.

2. Description of the Related Art

A conventional repeater includes a master unit installed near a Base station Transceiver Subsystem (BTS) and a remote unit installed away from the BTS by at least a predetermined distance. The master unit interfaces with the radio transceiver end of the BTS, which outputs radio signals, in an RF manner, converts coupled radio signals into signals that can be transmitted over a long distance, and sends the resulting signals to the remote unit. The master unit and the remote unit are connected through a relay cable, which is a physical channel through which relay signals are sent and received. The remote unit is installed in a shadow area, that is, an area that cannot be controlled by a BTS, and the master unit relays radio signals, coupled from the BTS, to the shadow area.

As a result, in a conventional relay service, relay units are used for respective communication services and manage shadow areas, that is, areas which cannot be managed by a BTS, so that a problem arises in that a plurality of relay units is required when a plurality of communication services is relayed.

SUMMARY OF THE INVENTION

Accordingly, the present invention has been made keeping in mind the above problems occurring in the prior art, and an object of the present invention is to provide a communication signal processing apparatus for a repeater that combines the communication signals of a plurality of communication services into a single communication signal and converts the communication signal into a signal that can be transmitted over a long distance.

In order to accomplish the above object, the present invention provides a communication signal processing apparatus for a repeater, including an interface for receiving the communication signals of at least two different communication services from the outside in a multiplexed manner and separately outputting the communication signals, and a communication signal processor for combining a pair of different communication signals, separately input from the interface, into a single digital signal, and converting the single digital signal into a frame, serializing the frame, and outputting the frame to the outside; wherein the interface includes a downstream interface that is equipped with an input signal interface for separately receiving the communication signals of at least two different communication services from the outside and separately outputting the signals; and wherein the communication signal processor includes a downstream signal processor that is equipped with a combiner for combining the two different digital communication signals, which form a pair and are separately input from the input signal interface of the interface, into a single digital signal, and outputting the single digital signal, a mapper for temporarily storing the digital signal input from the combiner and outputting the digital signal, a main frame unit for converting the digital signal, temporarily stored in the mapper, into a frame and outputting the frame, a frame management control unit for controlling operation of the main frame unit, a scrambler for scrambling the data frame input from the main frame unit and outputting the scrambled data frame, and a serializer for serializing the output signal input from the scrambler and outputting the serialized signal to the outside.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
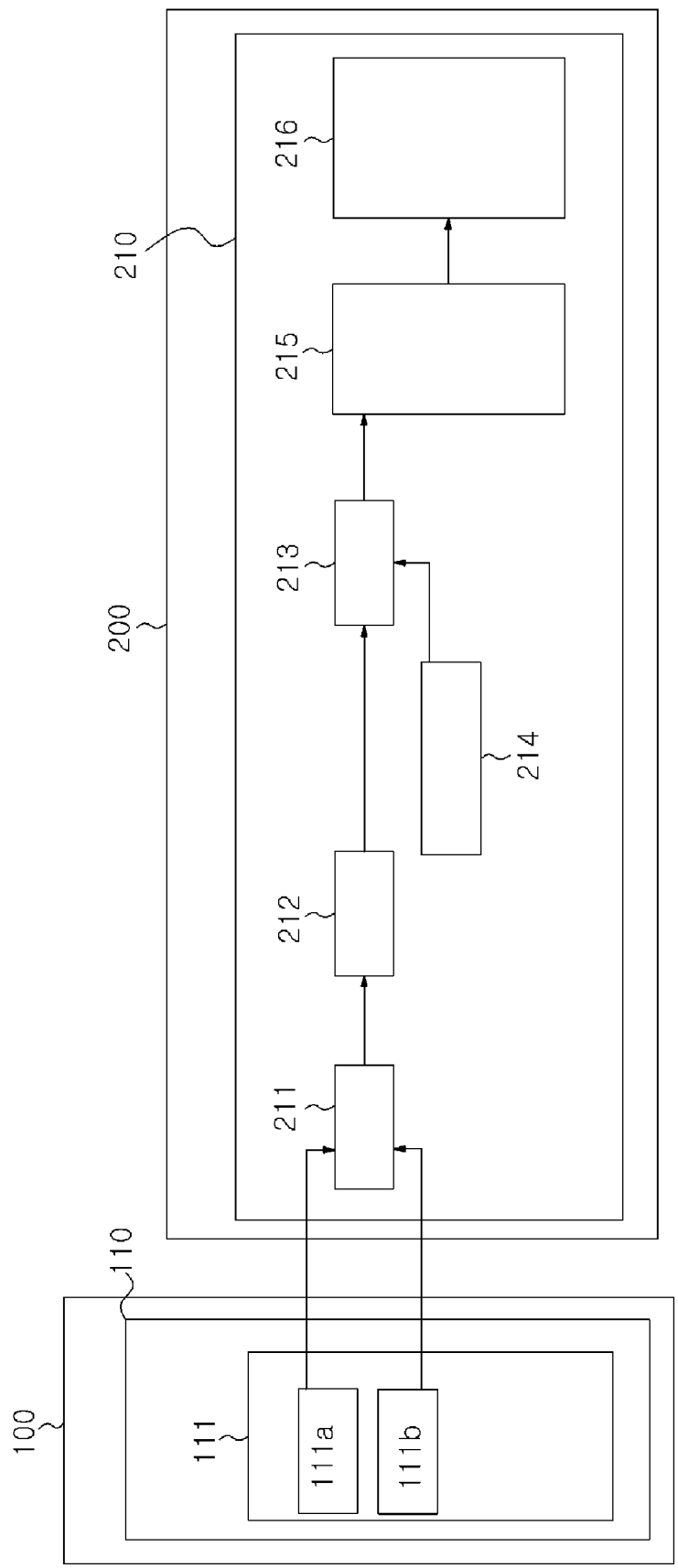
FIG. 1 is a diagram showing a communication signal processing apparatus for a repeater according to a first embodiment of the present invention.

Reference now should be made to the drawings, in which the same reference numerals are used throughout the different drawings to designate the same or similar components.

Preferred embodiments of the present invention will be described in detail below with reference to the accompanying drawings.

FIG. 1 is a diagram showing a communication signal processing apparatus for a repeater according to a first embodiment of the present invention, and shows an embodiment that is configured to enable digital unidirectional communication.

Referring to FIG. 1, the communication signal processing apparatus for a repeater according to the embodiment of the present invention includes an interface 100 for receiving the communication signals of at least two different communication services from the outside in a multiplexed manner and separately outputting the communication signals, and a communication signal processor 200 for combining a pair of different communication signals, separately input from the interface 100, into a single digital signal, and converting the single digital signal into a frame, serializing the frame and outputting the frame to the outside.

The interface 100 includes a downstream interface 110 that is equipped with an input signal interface 111 for separately receiving the communication signals of at least two different communication services from the outside and separately outputting the signals. In the present embodiment, the downstream interface 110 includes first and second input interfaces 111a and 111b, each of which receives only a single communication signal among the communication signals of different communication service providers and outputs the single digital communication signal. Although in the present embodiment the 1.25 Gbps digital signal of a first communication service is input to the first input interface 111a and the 1.25 Gbps digital signal of a second communication service is input to the second input interface 111b, the WiMAX digital signals of different communication service providers which are of different bandwidths may be input to the first and second input interfaces 111a and 111b when necessary, or any types of digital signals used in communication may be applied thereto.

The communication signal processor 200 includes a downstream signal processor 210 that is equipped with a combiner 211 for combining the two different digital communication signals, which form a pair and are separately input from the input signal interface 111 of the interface 100, into a single digital signal and outputting the single digital signal; a mapper 212 for temporarily storing the digital signal input from the combiner 211 and outputting the digital signal; a main frame unit 213 for converting the digital signal, temporarily stored in the mapper 212, into a frame and outputting the frame; a frame management control unit 214 for controlling the operation of the main frame unit 213; a scrambler 215 for scrambling and outputting the data frame input from the main frame unit 213; and a serializer 216 for serializing the output signal input from the scrambler 215 and outputting the serialized signal to the outside. In the present embodiment, the combiner 211 combines the two 1.25 Gbps digital signals input from the input signal interface 111 of the interface 100 into a single 1.25 Gbps digital signal, and outputs the single digital signal. The main frame unit 213 converts the digital signal, temporarily stored in the mapper 212, into a frame (packet), and outputs the frame. Here, the type of frame is not limited to a specific type. The frame management control unit 214 is a means for controlling the operation of the main frame unit 212 while a digital signal is converted into a frame. Although the frame management control unit 214 may be contained in the communication signal processor 200, it may be installed outside the communication signal processor 200 and remotely control the operation of the main frame unit 212. The scrambler 215 mixes a bit stream by scrambling the data frame input from the main frame unit 213, thereby providing the data frame with a characteristic that is robust to noise during signal transmission. The serializer 216 serializes the output signal input from the scrambler 215 so that it becomes suitable for optical transmission.

The present embodiment shown in FIG. 1 presents the communication signal processing apparatus for a repeater that may be applied to a unidirectional communication multiplex repeater and that may be extended in a variety of manners, such as those of the following embodiments.

Figure 2:
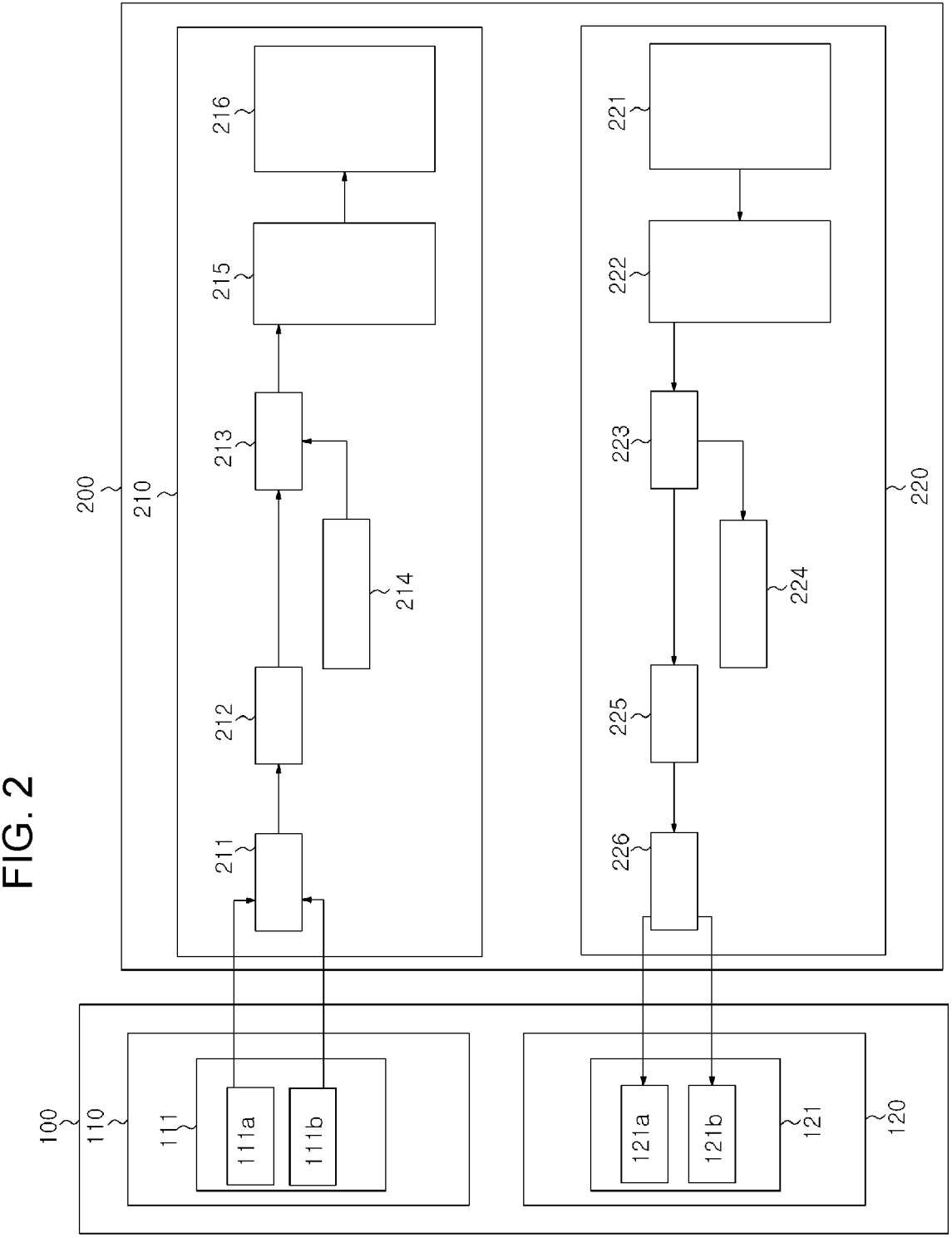
FIG. 2 is a diagram showing a communication signal processing apparatus for a repeater according to a second embodiment of the present invention.

FIG. 2 is a diagram showing a communication signal processing apparatus for a repeater according to a second embodiment of the present invention, and shows an embodiment that is configured to enable digital bidirectional communication.

According to the present embodiment, the communication signal processor 200 is supplemented with an upstream signal processor 220 that is equipped with a deserializer 221 for receiving the serialized digital signal from the outside, and parallelizing and outputting the serialized signal; a descrambler 222 for descrambling and outputting the output signal input from the deserializer 221; a main deframe unit 223 for deframing and outputting the data frame input from the descrambler 222; a deframe management control unit 224 for controlling the operation of the main deframe unit 223; a demapper 225 for temporarily storing and outputting the digital signal input from the main deframe unit 223; and a digital filter 226 for separating the signal digital signal, temporarily stored in the demapper 225, into two different digital communication signals, and separately outputting the digital communication signals. The combiner 211 combines the two 1.25 Gbps digital signals, input from the input signal interface 111 of the interface 100, into a single 1.25 Gbps digital signal, and outputs the single digital signal. Since the serialized single digital signal input from the deserializer 221 has the same form as the signal output from the serializer 216, signals output from the upstream signal processor 220 to an upstream interface 120 are two different digital communication signals corresponding to signals input from the downstream interface 110 to the downstream signal processor 210. The deframe management control unit 224 for controlling the operation of the main deframe unit 223 is also contained in the communication signal processor 200 and controls the operation of the main deframe unit 223, or may be installed outside the communication signal processor 200 and remotely control the operation of the main frame unit 212, like the frame management control unit 214. The digital filter 226 separates the single 1.25 Gbps digital signal, input from the demapper 225, into two different 1.25 Gbps digital communication signals, and separately outputs the two digital signals.

Furthermore, the interface 100 is supplemented with the upstream interface 120 that is equipped with an output signal interface 121 for separately receiving at least two different digital communication signals from the upstream signal processor 220 and separately outputting the digital signals to the outside. In the present embodiment, the upstream interface 120 includes first and second output interfaces 121a and 121b, and each of the first and second output interfaces 121a and 121b receives a single communication signal among different digital communication signals input from the digital filter 226 and outputs the single digital communication signal.

Figure 3:
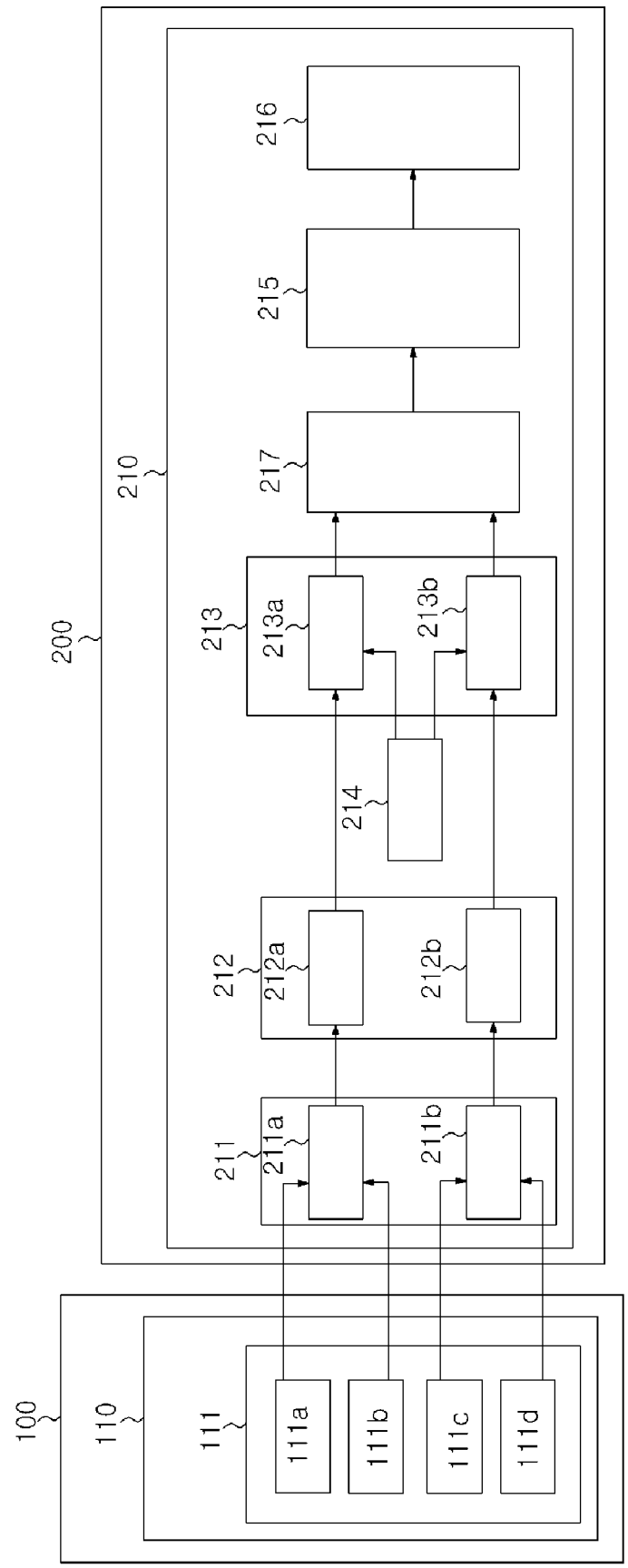
FIG. 3 is a diagram showing a communication signal processing apparatus for a repeater according to a third embodiment of the present invention.

FIG. 3 is a diagram showing a communication signal processing apparatus for a repeater according to a third embodiment of the present invention, and shows an embodiment that is configured to enable four different communication signals to be send via digital unidirectional communication.

The input signal interface 111 of the downstream interface 110 of the interface 100 includes four input interfaces 111a, 111b, 111c and 111d each of which receives a single communication signal from the outside and outputs the single communication signal.

Furthermore, the combiner 211 of the downstream signal processor 210 of the communication signal processor 200 includes a first combiner 211a for combining different digital communication signals, which form a pair and are separately input from the first and second input interfaces 111a and 111b, into a single digital signal and outputting the single digital signal, and a second combiner 211b for combining different digital communication signals, which form a pair and are separately input from the third and fourth input interfaces 111c and 111d, into a single digital signal and outputting the single digital signal. In the present embodiment, each of the first and second combiners 211a and 211b combines two 1.25 Gbps digital communication signals, which form a pair and are separately input, into a single 1.25 Gbps digital signal. The mapper 212 of the downstream signal processor 210 includes a first mapper 212a for temporarily storing and outputting the digital signal input from the first combiner 212a, and a second mapper 212b for temporarily storing and outputting the digital signal input from the second combiner 212a. The main frame unit 213 of the downstream signal processor 210 includes a first main frame unit 213a for primarily converting the digital signal, temporarily stored in the first mapper 212a, into a frame and outputting the frame, and a second main frame unit 213b for primarily converting the digital signal, temporarily stored in the second mapper 212b, into a frame and outputting the frame.

Furthermore, the downstream signal processor 210 is supplemented with a secondary frame unit 217 for secondarily converting the two primary data frames, which form a pair and are separately input from the main first and second frame units 213a and 213b, into a frame, and outputting the single secondary data frame to the scrambler 215. The secondary frame unit 217 secondarily converts two 1.25 Gbps primary data frames, input from the main first and second frame units 213a and 213b, into a frame, and outputs the single 2.5 Gbps secondary data frame.

According to the present embodiment, four different digital communication signals are converted into a frame twice and then the resulting frame is sent, and thus there arises an advantage in that transmission efficiency is significantly increased.

Figure 4:
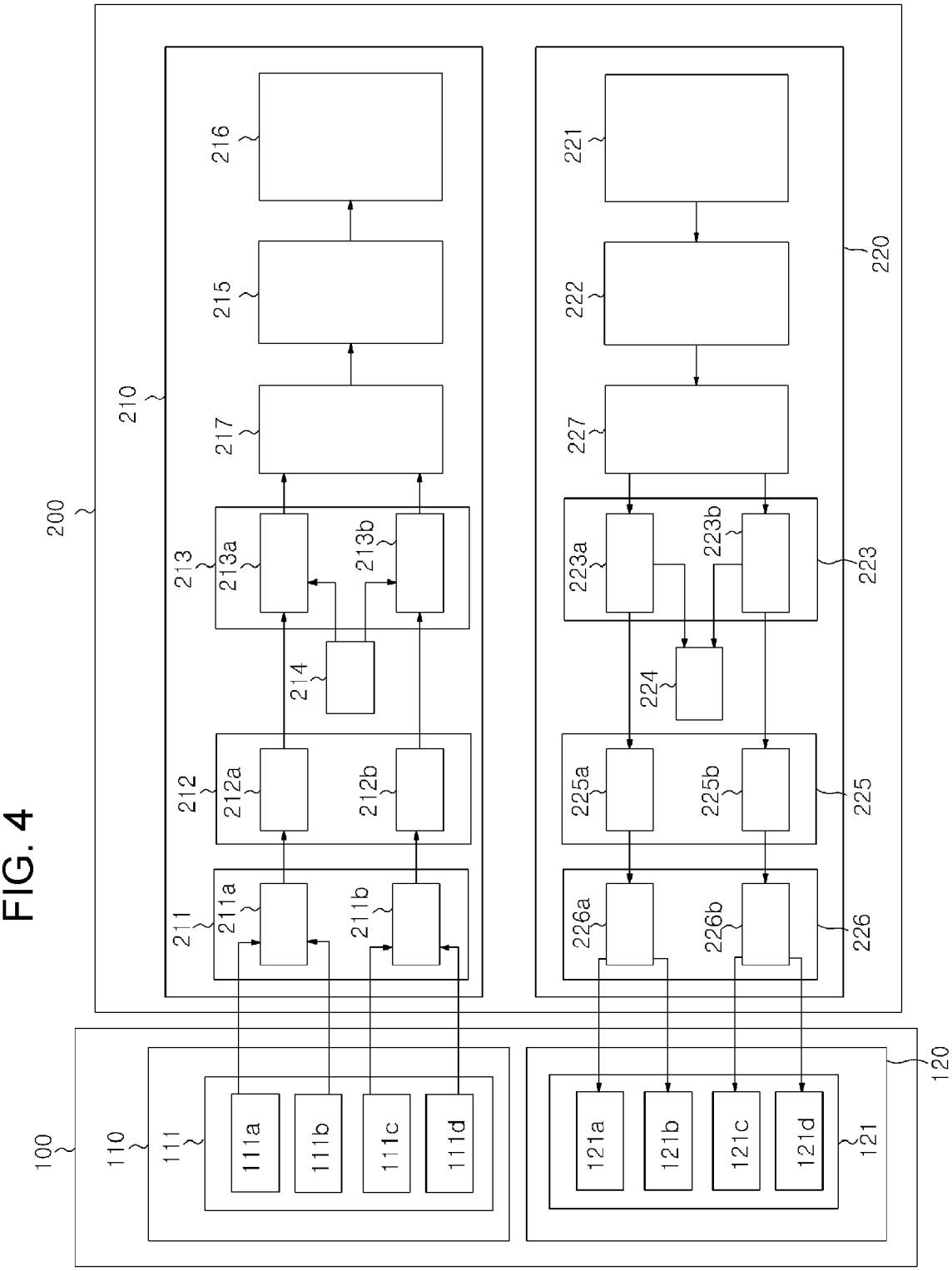
FIG. 4 is a diagram showing a communication signal processing apparatus for a repeater according to a fourth embodiment of the present invention.

FIG. 4 is a diagram showing a communication signal processing apparatus for a repeater according to a fourth embodiment of the present invention, and shows an embodiment that is configured to enable four different communication signals to be sent via digital bidirectional communication.

The communication signal processor 200 is supplemented with an upstream signal processor 220 that includes a deserializer 221 for receiving a serialized digital signal from the outside, and parallelizing and outputting the serialized digital signal; a descrambler 222 for descrambling and outputting the output signal input from the deserializer 221; a secondary deframe unit 227 for deframing the data frame input from the descrambler 222, separating the data frame into two data frames, and separately outputting the two data frames; a main deframe unit 223 including a first main deframe unit 223a for secondarily deframing and outputting the single data frame input from the secondary deframe unit 227, and a second main deframe unit 223b for secondarily deframing and outputting the other single data frame input from the secondary deframe unit 227; a deframe management control unit 224 for controlling the operation of the main first and second deframe units 223a and 223b; a demapper 225 including a first demapper 225a for temporarily storing and outputting the digital signal input from the first main deframe unit 223a, and a second demapper 225b for temporarily storing and outputting the digital signal input from the second main deframe unit 223b; and a digital filter 226 including a first digital filter 226a for separating the single digital signal, stored in the first demapper 225a, into two different digital communication signals and separately outputting the two different digital communication signals, and a second digital filter 226b for separating the single digital signal, stored in the second demapper 225b, into two different digital communication signals, and separately outputting the two different digital communication signals.

Furthermore, the interface 100 is supplemented with an upstream interface 120 that is equipped with an output signal interface 121 that includes four output interfaces 121a, 121b, 121c and 121d each for receiving a single digital communication signal among four different digital communication signals, output from the first and second digital filters 226a and 226b, and separately outputting the single digital communication signal to the outside.

According to the present embodiment, there arises an advantage in that four different digital communication signals can be sent in two directions in a multiplexed manner.

Figure 5:
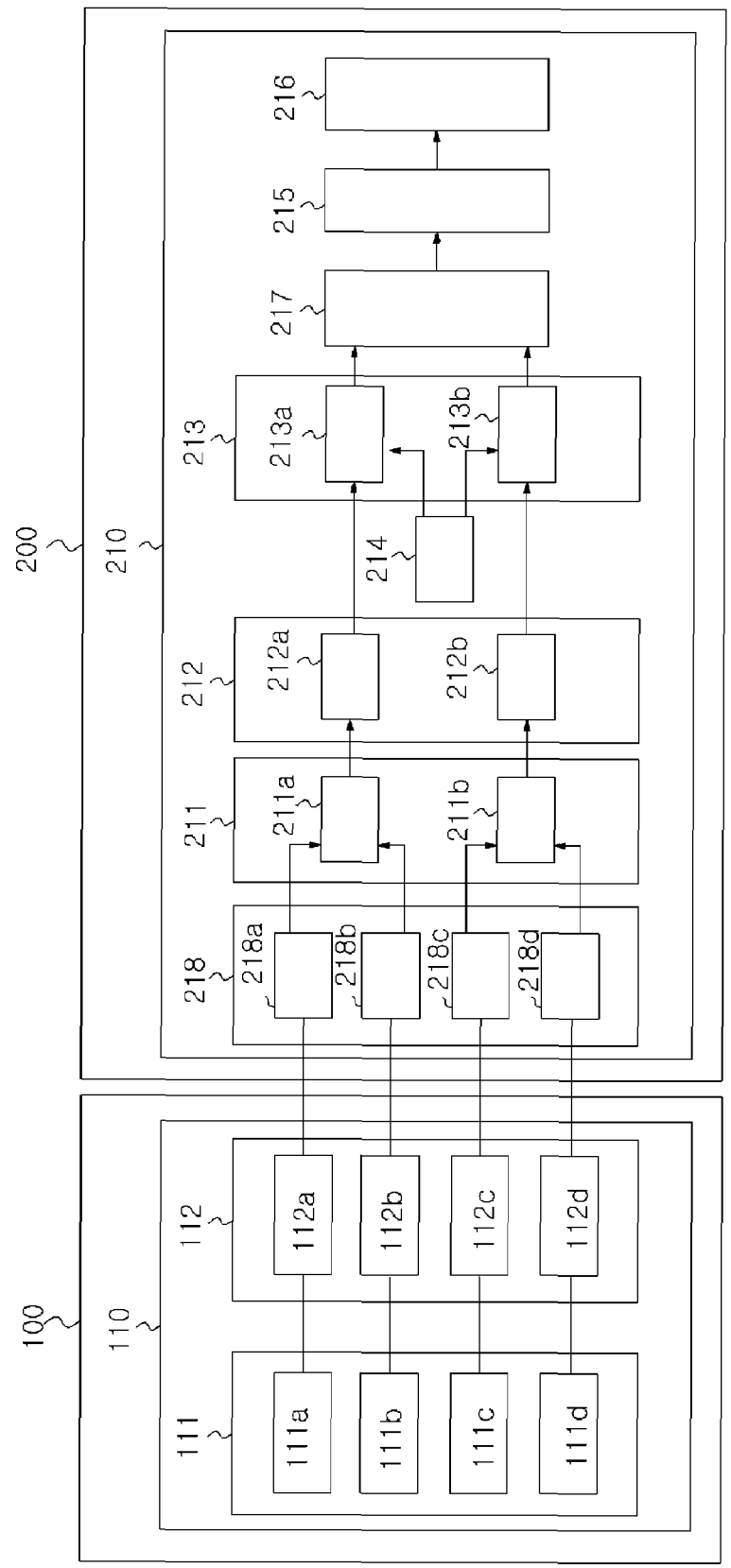
FIG. 5 is a diagram showing a communication signal processing apparatus for a repeater according to a fifth embodiment of the present invention.

FIG. 5 is a diagram showing a communication signal processing apparatus for a repeater according to a fifth embodiment of the present invention, and shows an embodiment that is configured to enable unidirectional IF communication.

The downstream interface 110 of the interface 100 is supplemented with an input signal IF level adjustment unit 112 for separately adjusting the levels of IF signals, separately input from the input signal interface 111, and separately outputting the level-adjusted IF signals.

Furthermore, the downstream signal processor 210 of the communication signal processor 200 is supplemented with an analog/digital converter 218 for separately converting the IF signals, separately input from the input signal IF level adjustment unit 112, into digital communication signals and separately outputting the digital communication signals to the combiner 211.

Here, reference characters "112a~112d" respectively denote first to fourth input signal IF level adjustment units that constitute the input signal IF level adjustment unit 112, and reference characters "218a~218d" respectively denote first to fourth analog/digital converters that constitute the analog/digital converter 218.

Figure 6:
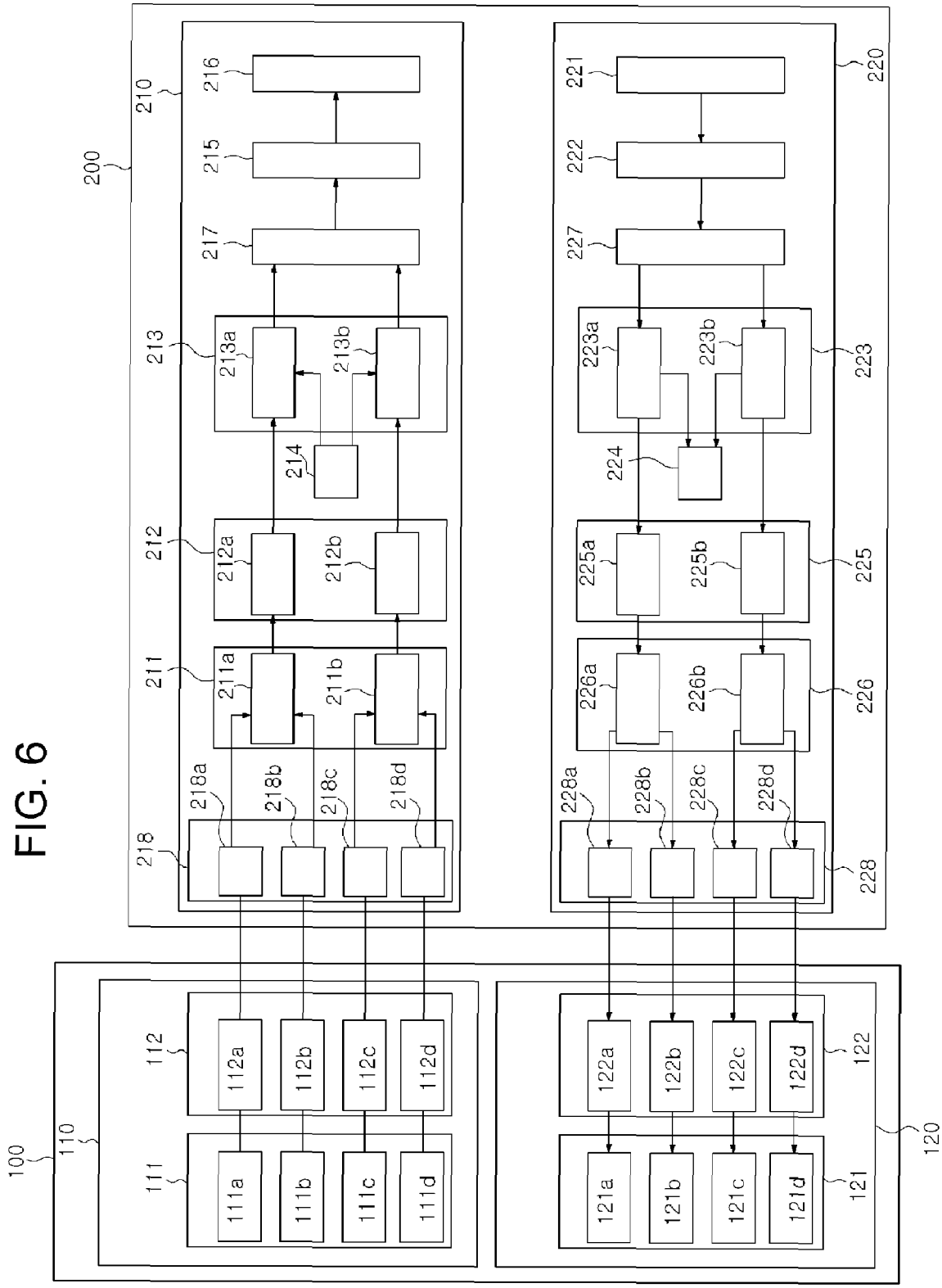
FIG. 6 is a diagram showing a communication signal processing apparatus for a repeater according to a sixth embodiment of the present invention.

FIG. 6 is a diagram showing a communication signal processing apparatus for a repeater according to a sixth embodiment of the present invention, and shows an embodiment that is configured to enable bidirectional IF communication.

The downstream interface 110 of the interface 100 is supplemented with an input signal IF level adjustment unit for adjusting the levels of IF signals, separately input from the input signal interface 111, and separately outputting the level-adjusted IF signals, and the down stream signal processor 210 of the communication signal processor 200 is supplemented with an analog/digital converter 218 for separately converting IF signals, separately input from the input signal IF level adjustment unit 112, into digital communication signals, and separately outputting the IF signals to the combiner 211.

Furthermore, the upstream signal processor 220 of the communication signal processor 200 is supplemented with a digital/analog converter 228 for separately converting different digital communication signals, separately input from the digital filter 226, into IF signals and outputting the IF signals, and the upstream interface 120 of the interface 100 is supplemented with an output signal IF level adjustment unit 122 for separately adjusting the levels of the IF signals, separately input from the digital/analog converter 228, and separately outputting the level-adjusted IF signals to the output signal interface 121.

Here, reference characters "122a~122d" respectively denote the first and fourth output signal IF level adjustment units of the output signal IF level adjustment unit 122, and reference characters "228a~228d" respectively denote first and fourth digital/analog converters of the digital/analog converter 228.

According to the present embodiment, there is an advantage in that four different IF signals can be sent in two directions in a multiplexed manner.

Figure 7:
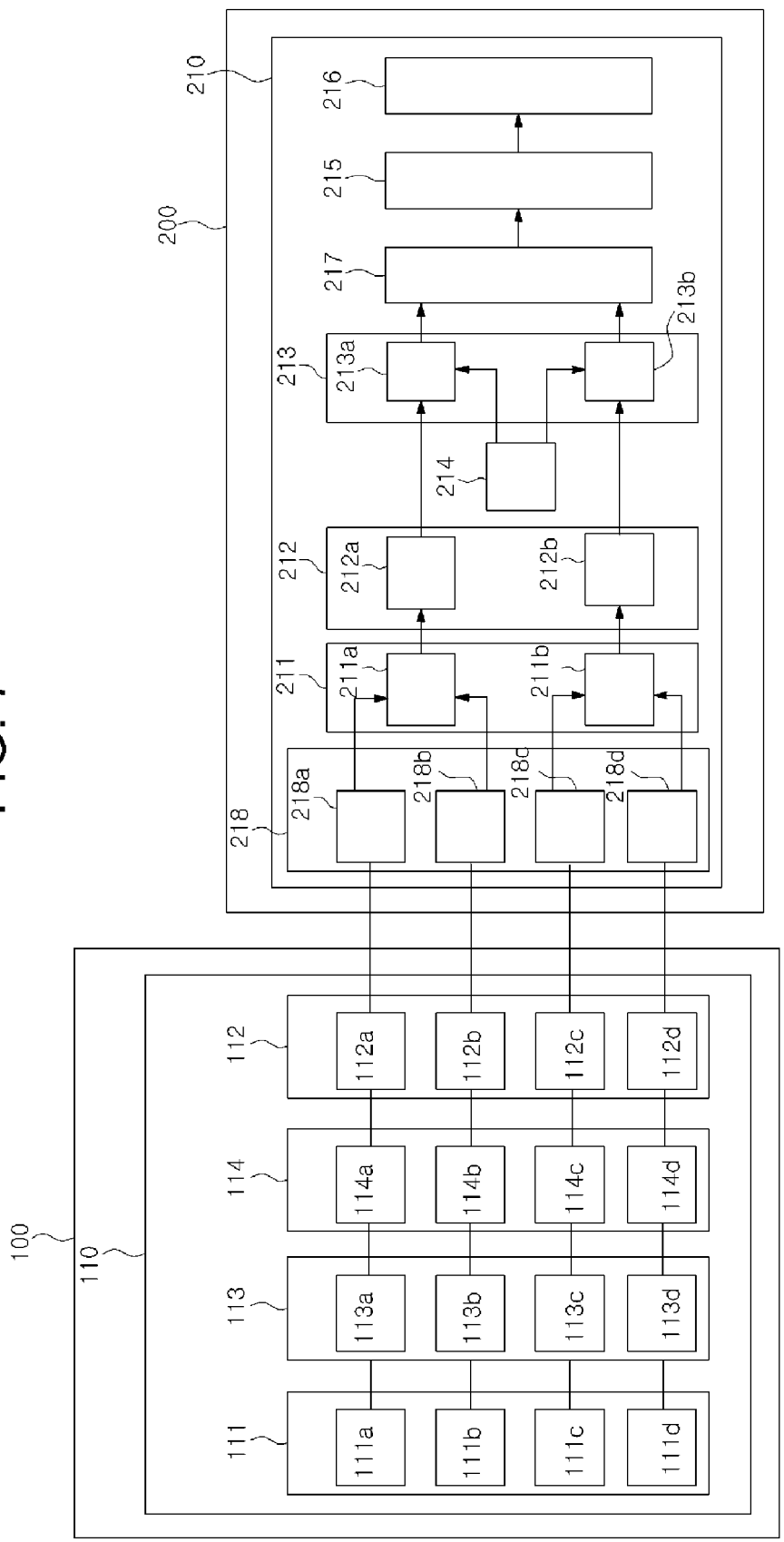
FIG. 7 is a diagram showing a communication signal processing apparatus for a repeater according to a seventh embodiment of the present invention.

FIG. 7 is a diagram showing a communication signal processing apparatus for a repeater according to a seventh embodiment of the present invention, and shows an embodiment that is configured to enable unidirectional RF communication.

The downstream interface 110 of the interface 100 is supplemented with an input signal RF level adjustment unit 113 for separately adjusting the levels of RF signals, separately input from the input signal interface 111, and separately outputting the level-adjusted RF signals, and an input signal IF block 114 for separately converting the RF signals, separately input from the input signal RF level adjustment unit 113, into IF signals and separately outputting the resulting IF signals to the input signal IF level adjustment unit 112.

Here, reference characters "113a~113d" respectively denote the first to fourth input signal RF level adjustment units of the input signal RF level adjustment unit 113, and reference characters "114a~114d" respectively denote the first to fourth input signal IF blocks of the input signal IF block 114.

Figure 8:
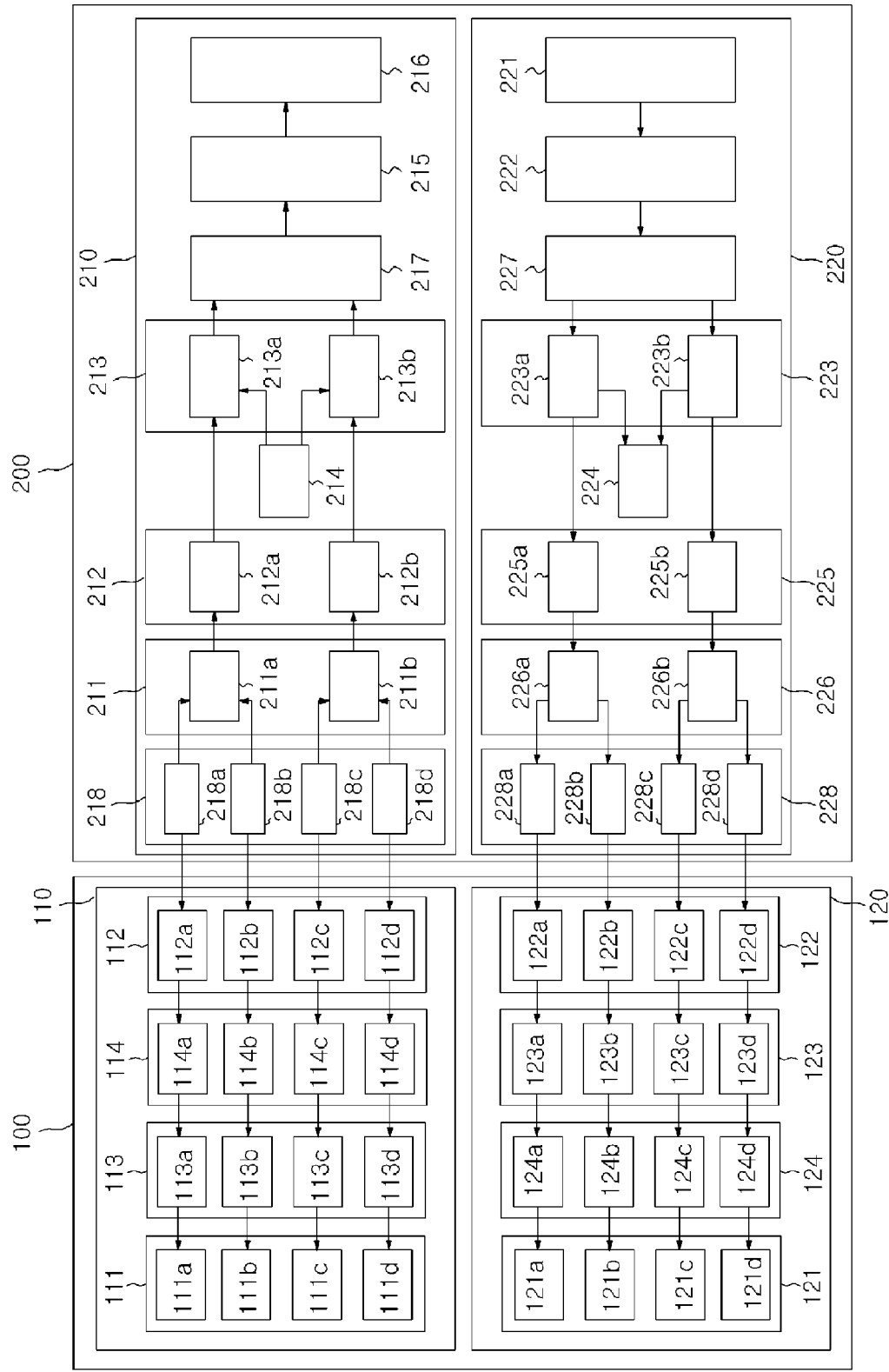
FIG. 8 is a diagram showing a communication signal processing apparatus for a repeater according to an eighth embodiment of the present invention.

FIG. 8 is a diagram showing a communication signal processing apparatus for a repeater according to an eighth embodiment of the present invention, and shows an embodiment that is configured to enable bidirectional RF communication.

The downstream interface 110 of the interface 100 is supplemented with an input signal RF level adjustment unit 113 for separately adjusting the levels of the RF signals, separately input from the input signal interface 111, and separately outputting the level-adjusted RF signals, and an input signal IF block 114 for separately converting the RF signals, separately input from the RF level adjustment unit 113, into IF signals and separately outputting the resulting IF signals to the input signal IF level adjustment unit 112.

Furthermore, the upstream interface 120 of the interface 100 is supplemented with an output signal IF block 123 for separately converting the IF signals, separately input from the output signal IF level adjustment unit 122, into RF signals and separately outputting the resulting RF signals, and an output signal RF level adjustment unit 124 for separately adjusting the levels of the RF signals, separately input from the output signal IF block 123, and separately outputting the level-adjusted RF signals.

Here, reference characters "123a to 123d" respectively denote the first to fourth output signal IF blocks of the output signal IF block 123, and reference characters "124a to 124d" respectively denote the first to fourth output signal RF level adjustment units of the output signal RF level adjustment unit 124.

According to the present invention, the communication signals of different communication services are multiplexed by combining them into a single communication signal, the multiplexed communication signal is converted into a signal that can be transmitted over a long distance, and the resulting signal is output, so that the relay networks of the different communication services can be efficiently incorporated, and thus there arises an advantage in that the cost of investment in the relay network equipment of communication services can be considerably reduced.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A communication signal processing apparatus for a repeater, comprising an interface for receiving communication signals of at least two different communication services from an outside in a multiplexed manner and separately outputting the communication signals, and a communication signal processor for combining a pair of different communication signals, separately input from the interface, into a single digital signal, and converting the single digital signal into a frame, serializing the frame, and outputting the frame to the outside;

wherein the interface comprises a downstream interface that is equipped with an input signal interface for separately receiving communication signals of at least two different communication services from the outside and separately outputting the signals; and wherein the communication signal processor comprises a downstream signal processor that is equipped with a combiner for combining the two different digital communication signals, which form a pair and are separately input from the input signal interface of the interface, into a single digital signal, and outputting the single digital signal, a mapper for temporarily storing the digital signal input from the combiner and outputting the digital signal, a main frame unit for converting the digital signal, temporarily stored in the mapper, into a frame and outputting the frame, a frame management control unit for controlling operation of the main frame unit, a scrambler for scrambling the data frame input from the main frame unit and outputting the scrambled data frame, and a serializer for serializing the output signal input from the scrambler and outputting the serialized signal to the outside, wherein the communication signal processor is supplemented with an upstream signal processor that is equipped with a deserializer for receiving the serialized digital signal from the outside, and parallelizing and outputting the serialized signal, a descrambler for descrambling and outputting the output signal input from the deserializer, a main deframe unit for deframing and outputting the data frame input from the descrambler, a deframe management control unit for controlling operation of the main deframe unit, a demapper for temporarily storing and outputting the digital signal input from the main deframe unit, and a digital filter for separating the signal digital signal, temporarily stored in the demapper, into two different digital communication signals, and separately outputting the digital communication signals; and the interface is supplemented with an upstream interface that is equipped with an output signal interface for separately receiving at least two different digital communication signals from the upstream signal processor and separately outputting the digital signals to the outside.

2. The communication signal processing apparatus as set forth in claim 1, wherein the input signal interface of the downstream interface of the interface includes four input interfaces each of which receives a single communication signal from the outside and outputs the single communication signal;

the combiner of the downstream signal processor of the communication signal processor comprises a first combiner for combining different digital communication signals, which form a pair and are separately input from the first and second input interfaces, into a single digital signal and outputting the single digital signal, and a second combiner for combining different digital communication signals, which form a pair and are separately input from the third and fourth input interfaces, into a single digital signal and outputting the single digital signal; the mapper of the downstream signal processor comprises a first mapper for temporarily storing and outputting the digital signal input from the first combiner, and a second mapper for temporarily storing and outputting the digital signal input from the second combiner; the main frame unit of the downstream signal processor comprises a first main frame unit for primarily converting the digital signal, temporarily stored in the first mapper, into a frame and outputting the frame, and a second main frame unit for primarily converting the digital signal, temporarily stored in the second mapper, into a frame and outputting the frame; and the downstream signal processor is supplemented with a secondary frame unit for secondarily converting the two primary data frames, which form a pair and are separately input from the main first and second frame units, into a frame and outputting the single secondary data frame to the scrambler.

3. The communication signal processing apparatus as set forth in claim 2, wherein the communication signal processor is supplemented with an upstream signal processor that includes a deserializer for receiving a serialized digital signal from the outside, and parallelizing and outputting the serialized digital signal; a descrambler for descrambling and outputting the output signal input from the deserializer; a secondary deframe unit for deframing the data frame input from the descrambler, separating the data frame into two data frames, and separately outputting the two data frames; a main deframe unit comprising a first main deframe unit for secondarily deframing and outputting the single data frame input from the secondary deframe unit, and a second main deframe unit for secondarily deframing and outputting the other single data frame input from the secondary deframe unit; a deframe management control unit for controlling operation of the main first and second deframe units; a demapper comprising a first demapper for temporarily storing and outputting the digital signal input from the first main deframe unit, and a second demapper for temporarily storing and outputting the digital signal input from the second main deframe unit; and a digital filter comprising a first digital filter for separating the single digital signal, stored in the first demapper, into two different digital communication signals and separately outputting the two different digital communication signals, and a second digital filter for separating the single digital signal, stored in the second demapper, into two different digital communication signals, and separately outputting the two different digital communication signals; and the interface is supplemented with an upstream interface that is equipped with an output signal interface that comprises four output interfaces each for receiving a single digital communication signal among four different digital communication signals output from the first and second digital filters, and separately outputting the single digital communication signal to the outside.

4. The communication signal processing apparatus as set forth in claim 1, wherein the downstream interface of the interface is supplemented with an input signal IF level adjustment unit for separately adjusting levels of IF signals, separately input from the input signal interface, and separately outputting the level-adjusted IF signals; and the downstream signal processor of the communication signal processor is supplemented with an analog/digital converter for separately converting the IF signals, separately input from the input signal IF level adjustment unit, into digital communication signals and separately outputting the digital communication signals to the combiner.

5. The communication signal processing apparatus as set forth in claim 4, wherein the downstream interface of the interface is supplemented with an input signal RF level adjustment unit for separately adjusting levels of the RF signals, separately input from the input signal interface, and separately outputting the level-adjusted RF signals, and an input signal IF block for separately converting the RF signals, separately input from the input signal RF level adjustment unit, into IF signals and separately outputting the resulting IF signals to the input signal IF level adjustment unit.

6. The communication signal processing apparatus as set forth in claim 1, wherein:

the downstream interface of the interface is supplemented with an input signal IF level adjustment unit for adjusting the levels of the IF signals, separately input from the input signal interface, and separately outputting the level-adjusted IF signals, and the down stream signal processor of the communication signal processor is supplemented with an analog/digital converter for separately converting the IF signals, separately input from the input signal IF level adjustment unit, into digital communication signals, and separately outputting the IF signals to the combiner; and the upstream signal processor of the communication signal processor is supplemented with a digital/analog converter for separately converting different digital communication signals, separately input from the digital filter, into IF signals and outputting the IF signals, and the upstream interface of the interface is supplemented with an output signal IF level adjustment unit for separately adjusting levels of the IF signals, separately input from the digital/analog converter, and separately outputting the level-adjusted IF signals to the output signal interface.

7. The communication signal processing apparatus as set forth in claim 6, wherein the downstream interface of the interface is supplemented with an input signal RF level adjustment unit for separately adjusting levels of the RF signals, separately input from the input signal interface, and separately outputting the level-adjusted RF signals, and an input signal IF block for separately converting the RF signals, separately input from the RF level adjustment unit, into IF signals and separately outputting the resulting IF signals to the input signal IF level adjustment unit; and the upstream interface of the interface is supplemented with an output signal IF block for separately converting the IF signals, separately input from the output signal IF level adjustment unit, into RF signals and separately outputting the resulting RF signals, and an output signal RF level adjustment unit for separately adjusting levels of the RF signals, separately input from the output signal IF block. and separately outputting the level-adjusted RF signals.

* * * * *